United States Patent
Kitajima et al.

(10) Patent No.: US 6,739,122 B2
(45) Date of Patent: May 25, 2004

(54) AIR-FUEL RATIO FEEDBACK CONTROL APPARATUS

(75) Inventors: Shinichi Kitajima, Wako (JP); Asao Ukai, Wako (JP); Shigetaka Kuroda, Wako (JP); Futoshi Nishioka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/196,154

(22) Filed: Jul. 17, 2002

(65) Prior Publication Data

US 2003/0041590 A1 Mar. 6, 2003

(30) Foreign Application Priority Data

Aug. 28, 2001 (JP) .................................. 2001-258699

(51) Int. Cl.[7] .................................. F01N 3/00
(52) U.S. Cl. ..................... 60/277; 60/274; 60/276; 60/285
(58) Field of Search ............... 60/274, 276, 277, 60/285; 123/674, 696; 701/103, 109

(56) References Cited

U.S. PATENT DOCUMENTS 5,848,528 A * 12/1998 Liu ........................... 60/274
5,852,930 A * 12/1998 Yasui et al. ................. 60/285
6,085,518 A * 7/2000 Yamashita et al. ........... 60/274
6,453,665 B1 * 9/2002 Bower, Jr. et al. ........... 60/285
6,470,674 B1 * 10/2002 Yamaguchi et al. .......... 60/277

FOREIGN PATENT DOCUMENTS

| JP | 10-9019 | 1/1998 |
| JP | 10-299460 | 11/1998 |
| JP | 2001-107719 | 4/2001 |

* cited by examiner

Primary Examiner—Thomas Denion
Assistant Examiner—Tu M. Nguyen
(74) Attorney, Agent, or Firm—Arent Fox

(57) ABSTRACT

The present invention provides an air-fuel ratio feedback control apparatus for an internal-combustion engine. The apparatus includes an air-fuel ratio detector that is disposed in an exhaust system of the engine so as to detect an air-fuel ratio of exhaust gas, NOx purifier for purifying NOx contained in the exhaust gas during a lean operation and feedback controller for making a feedback control upon an air-fuel ratio of air-fuel mixture to be supplied to the engine based on an output of the air-fuel ratio detector. A diagnostic system diagnoses the NOx purifier based on an output of an O2 sensor disposed downstream of the NOx purifier when the air-fuel ratio of the air-fuel mixture to be supplied to the engine has been changed from lean to rich and gain changer for making a feedback control gain of the feedback controller smaller when the air-fuel ratio is changed from lean to rich.

15 Claims, 8 Drawing Sheets

AIR-FUEL RATIO FEEDBACK CONTROL APPARATUS

BACKGROUND OF THE INVENTION

This invention relates to feedback control of air-fuel ratio of an internal-combustion engine and, more specifically, to air-fuel ratio feedback control to be performed when deterioration of a lean NOx catalyst is detected.

Japanese Patent Application Unexamined Publication (Kokai) No. H10-299460 discloses a device for determining deterioration of a NOx trapping agent based on outputs of oxygen density sensors disposed upstream and downstream respectively of the NOx trapping agent. More specifically, after air-fuel ratio enrichment is started for releasing NOx from the NOx trapping agent in an exhaust gas purifying device, the prior art device measures a time period required for an output value of an oxygen density sensor disposed downstream of the exhaust gas purifying device to change to a rich air-fuel ratio after an output value of a LAF (linear air-fuel ratio) sensor disposed upstream of the exhaust gas purifying device has changed to a rich air-fuel ratio. The device determines that the NOx trapping agent has deteriorated when the measured time period is less than a predetermined value.

Japanese Patent Application Unexamined Publication (Kokai) No. 2001-107719 discloses a system for determining deterioration of a lean NOx catalyst in an internal-combustion engine which is provided with a three-way catalyst and a lean NOx catalyst in its exhaust system. The system first measures a time period required for an output TVO2 of an O2 sensor disposed downstream of the lean NOx catalyst to change to a value representing a rich air-fuel ratio after an output SVO2 of an O2 sensor disposed upstream of the lean NOx catalyst changed to a value representing a rich air-fuel ratio. The system determines deterioration of the NOx catalyst based on the measured time period.

Besides, Japanese Patent Application Unexamined Publication (Kokai) No. H10-9019 discloses a technique for using an adaptive controller for calculating adaptive parameters representing dynamic characteristics of an internal-combustion engine so as to control air-fuel ratio based on the calculated parameters.

However, in such conventional techniques, if control responsiveness is high when they are used to make a feedback control upon an air-fuel ratio, wrong detection of the NOx catalyst deterioration may take place because actual air-fuel ratio may overshoot when the air-fuel ratio is enriched for determining deterioration of the NOx catalyst.

SUMMARY OF THE INVENTION

In order to resolve the above-described problem, the present invention provides an air-fuel ratio feedback control apparatus for an internal-combustion engine. The air-fuel ratio feedback control apparatus according to an aspect of the invention comprises an air-fuel ratio detector that is disposed in an exhaust system of the internal-combustion engine for detecting air-fuel ratio of exhaust gas. The apparatus further comprises a NOx purifier for purifying NOx contained in the exhaust gas during a lean operation and a feedback controller for performing feedback control of an air-fuel ratio of air-fuel mixture to be supplied to the internal-combustion engine based on the output of the air-fuel ratio detector. The air-fuel ratio feedback control apparatus further comprises diagnostic system for diagnosing the NOx purifier by changing the air-fuel ratio of the air-fuel mixture to be supplied to the internal-combustion engine from lean to rich and detecting outputs of an O2 sensor disposed downstream of the NOx purifier. The feedback control apparatus further comprises a gain changer for changing feedback control gain of the feedback controller to a smaller value when the air-fuel ratio is changed from lean to rich by the diagnostic system.

According to an aspect of the present invention, the feedback control gain of the feedback controller is made smaller when the diagnostic device for diagnosing the NOx purifier changes the air-fuel ratio from lean to rich, so that the overshoot of the actual air-fuel ratio can be avoided and detection accuracy in the diagnosis for the NOx purifier can be improved.

DESCRIPTION OF THE PREFERRED EMBODIMENTS

Figure 1:
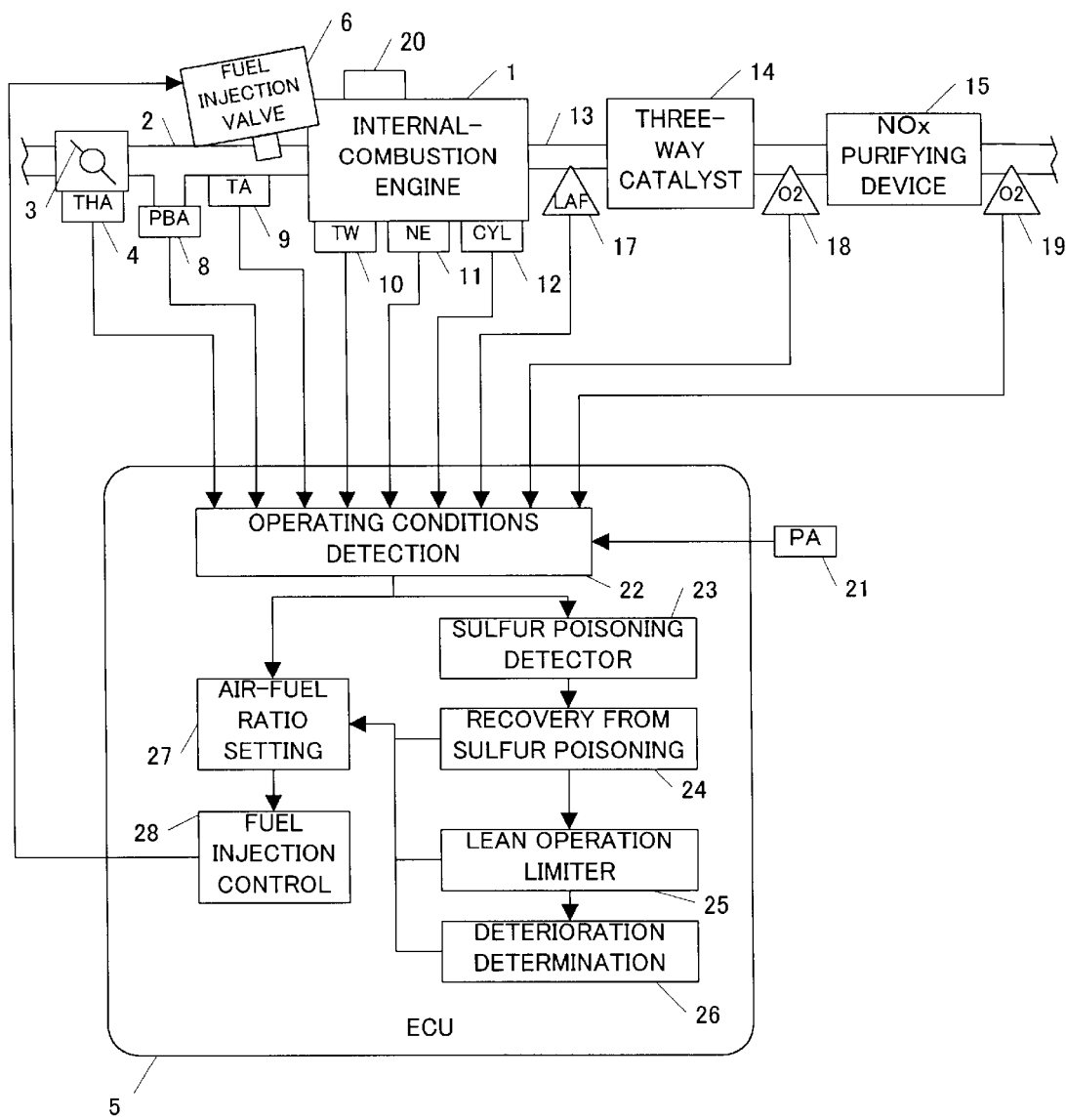
FIG. 1 is a diagram showing an overall arrangement of an internal-combustion engine and its controller according to one embodiment of the present invention.

FIG. 1 shows an overall arrangement of an internal-combustion engine (hereinafter referred to as an "engine") and its controller including a failure diagnostic device according to one embodiment of the present invention. A throttle valve 3 is disposed in the route of an air intake pipe 2 connected to an engine 1. The throttle valve 3 is connected to a throttle valve opening degree (THA) sensor 4. An electric signal that represents an opening degree of the throttle valve 3 is sent from the sensor 4 to an electronic control unit (hereinafter referred to as "ECU") 5. The structure of the ECU 5 will be described hereinafter.

A fuel injection valve 6 is provided, for each cylinder, between the engine 1 and the throttle valve 3 slightly upstream of the air intake valve (not shown) of the engine 1. An absolute air-intake-pipe internal pressure (PBA) sensor 8 and an intake air temperature (TA) sensor 9 are connected to the air intake pipe 2, so as to detect an absolute pressure and an intake air temperature respectively to provide them to the ECU 5 in the form of electric signals. An engine water temperature (TW) sensor 10, which is mounted on the main body of the engine 1, comprises a thermistor and the like. The sensor 10 detects an engine water temperature (cooling water temperature) TW and sends a corresponding electric signal to the ECU 5.

An engine revolution (NE) sensor 11 and a cylinder identification (CYL) sensor 12 are provided in the peripheries of the camshaft or the crankshaft (not shown) of the engine 1. The engine revolution sensor 11 outputs a TDC signal pulse at every top dead center point (TDC) when each cylinder of the engine 1 begins its intake stroke. The cylinder identification sensor 12 outputs a cylinder identification signal pulse at a predetermined crank angle for a specific cylinder. Those signal pulses are transmitted to the ECU 5.

A three-way catalyst 14 and a NOx purifier 15 or a NOx cleaner are disposed in an exhaust pipe 13. The three-way catalyst 14 is positioned upstream of the NOx purifier 15. The three-way catalyst has a function of accumulating O2 contained in the exhaust gas in an exhaust lean condition in which the air-fuel ratio of the mixture to be supplied to the engine 1 is leaner than a stoichiometric air-fuel ratio and the density of the O2 in the exhaust gas is comparatively high. In contrast, the catalyst oxidizes the HC and the CO contained in the exhaust gas using thus accumulated O2 in an exhaust rich condition in which the air-fuel ratio of the mixture to be supplied to the engine 1 is richer than the stoichiometric air-fuel ratio, the density of the O2 contained in the exhaust gas being low and the density of the HC, CO constituents contained in the exhaust gas being high.

The NOx purifier or NOx cleaner 15 incorporates a NOx trapping agent for trapping NOx and a catalyst for promoting oxidization and reduction. The NOx trapping agent traps the NOx in the exhaust lean condition in which the air-fuel ratio of the mixture to be supplied to the engine 1 is leaner than the stoichiometric air-fuel ratio. On the other hand, around the stoichiometric air-fuel ratio or in the exhaust rich condition in which the air-fuel ratio is richer than the stoichiometric air-fuel ratio, the trapped NOx is reduced by HC and CO and discharged in the form of nitrogen gas, while concurrently the HC and CO are oxidized and discharged in the form of steam and carbon dioxide.

When the trapping of NOx continues to reach an trapping capability limit of the NOx trapping agent, i.e., when the maximum NOx trapping volume is reached, no further NOx can be trapped. In such a case, the air-fuel ratio must be set richer in order to reduce and discharge the NOx. This operation is called a reduction-enrichment operation.

A linear oxygen density sensor (hereinafter referred to as an "LAF sensor") 17 is disposed upstream of the three-way catalyst 14. The LAF sensor 17 sends to the ECU 5 an electric signal that is substantially proportional to the oxygen density (air-fuel ratio) of the exhaust gas.

A binary type oxygen density sensor (hereinafter referred to as "O2 sensor") 18 is disposed between the three-way catalyst 14 and the NOx purifying device 15 and another binary type O2 sensor 19 is disposed downstream of the NOx purifying device 15. Signals detected by these sensors are transmitted to the ECU 5.

The O2 sensors 18, 19 have such characteristic that their outputs switch in a binary manner around the stoichiometric air-fuel ratio. That is, the output takes a high level on the rich side and takes a low level on the lean side. In the following description, the O2 sensor 18 and the O2 sensor 19 will be referred to as the "upstream O2 sensor" 18 and the "downstream O2 sensor" 19 respectively.

The engine 1 has a valve timing switch mechanism 20 that can alternately set the valve timings for the air intake valve and the air exhaust valve at two levels, one being a quick valve timing that is appropriate for a rapidly rotating region of the engine, and the other being a slow valve timing that is appropriate for a slowly rotating region. The switching of the valve timing includes the switching of the distance lifted by the valves. Further, when the slow valve timing is selected, one of the two valves is halted in order to ensure stable combustion, even when the air-fuel ratio is leaner than the stoichiometric air-fuel ratio.

Additionally, an atmospheric pressure sensor 21 for detecting the atmospheric pressure (PA) is connected to the ECU 5. The detected signal is supplied to the ECU 5.

The ECU 5 includes a ROM for storing programs and data, and a RAM for providing an operational workspace to store/retrieve programs and data required at the runtime. It also includes a CPU for executing programs and an input interface for processing input signals from various sensors and a drive circuit for sending control signals to such engine sections as the fuel injection valve 6. All outputs from the various sensors are received by the input interface and are processed in accordance with the programs stored in the ROM. With such a hardware structure, functional blocks in FIG. 1 represent ECU 5.

The ECU 5 comprises functional blocks of sulfur-poisoning detector 23, sulfur-poisoning recovery means 24, lean operation limiter 25, deterioration determining means 26, air-fuel ratio setting means 27 and fuel injection controller 28.

The sulfur-poisoning detector 23 detects sulfur poisoning of the three-way catalyst 14 based on the output of the upstream O2 sensor 18. The sulfur-poisoning recovery means 24 performs an enrichment of the air-fuel ratio so as to remove SOx and recovers the three-way catalyst 14 when the sulfur poisoning of the three-way catalyst 14 is detected.

In order to decrease the influence of the SOx upon the deterioration determination for the NOx purifying device 15 which leads to a wrong diagnosis, the lean operation limiter 25 limits the lean operation of the engine 1 to a region having less SOx poisoning after the three-way catalyst 14 has been recovered by the sulfur-poisoning recovery means 24. The deterioration determination means 26 performs the deterioration determination for the NOx purifying device 15 based on the output of the downstream O2 sensor 19 when the air-fuel ratio of the mixture to be supplied to the engine 1 has been enriched. An operating conditions detector 22 determines various operating conditions based on the above described various engine parameter signals.

The air-fuel ration setting means 27 sets a target air-fuel ratio based on the determined operating conditions, setting for enriching the air-fuel ratio made by the sulfur-poisoning recovery means, and permission or prohibition of the lean operation by the lean operation limiter. The fuel injection controlling means 28 calculates, according to the following equation (1), a fuel injection time TOUT of the fuel injection valve 6 which is opened in synchronization with the TDC signal pulse, so as to control the fuel injection valve 6.

$$TOUT = TIM \times KCMD \times KLAF \times KPA \times K1 + K2 \qquad (1)$$

In the equation (1), TIM represents a base fuel amount, or, more specifically, a base fuel injection time of the fuel injection valve 6, which is to be determined through searching a TI map which is set based on the engine rotational speed NE and the absolute air-intake-pipe internal pressure PBA. The TI map is set so that the air-fuel ratio of the mixture to be supplied to the engine may become almost equal to the stoichiometric air-fuel ratio under the operating condition corresponding to the engine rotational speed NE and the absolute air-intake-pipe internal pressure PBA. In other words, the base fuel amount TIM is almost in proportion to the intake air amount per unit time of the engine (mass flow rate).

KCMD represents a target air-fuel ratio coefficient, which is set in accordance with such engine operating parameters as engine rotational speed NE, throttle valve opening degree THA and engine water temperature TW. The target air-fuel coefficient KCMD is proportional to the fuel-air ratio F/A which is the reciprocal of air-fuel ratio A/F, and has a value of 1.0 at the stoichiometric air-fuel ratio. Accordingly, the coefficient KCMD is also called a target equivalent ratio. Besides, the target air-fuel coefficient KCMD is set to a predetermined enrichment value KCMDRR or KCMDRM for enriching the air-fuel ratio when the reduction enrichment or the deterioration determination for the NOx purifying device 15 is performed as described below.

KLAF represents an air-fuel ratio correction coefficient that is calculated under the STR control so that a detected equivalent ratio KACT, which is obtained from a detected value provided by the LAF sensor 17, matches the target equivalent ratio KCMD when execution conditions for the feedback control are satisfied.

KPA represents an atmospheric pressure correction coefficient to be set in accordance with the atmospheric pressure PA. It is set to be 1.0 (an uncorrected value) when the atmospheric pressure PA is almost equal to 101.3 kPa. The value of PA is set larger than 1.0 in accordance with the decrease of the atmospheric pressure PA, so that the fuel supply amount may be corrected so as to be increased. Thus, the atmospheric pressure correction coefficient KPA is set so as to increase in accordance with the decrease of the atmospheric pressure PA, and the fuel supply amount is corrected so as to be increased in accordance with the decrease of the atmospheric pressure PA.

K1 and K2 represent another correction coefficient and a correction variable that are obtained in accordance with various engine parameter signals. They are determined to be certain predetermined values with which various characteristics such as the fuel characteristics and engine acceleration characteristics depending on the engine operating conditions are optimized.

Figure 2:
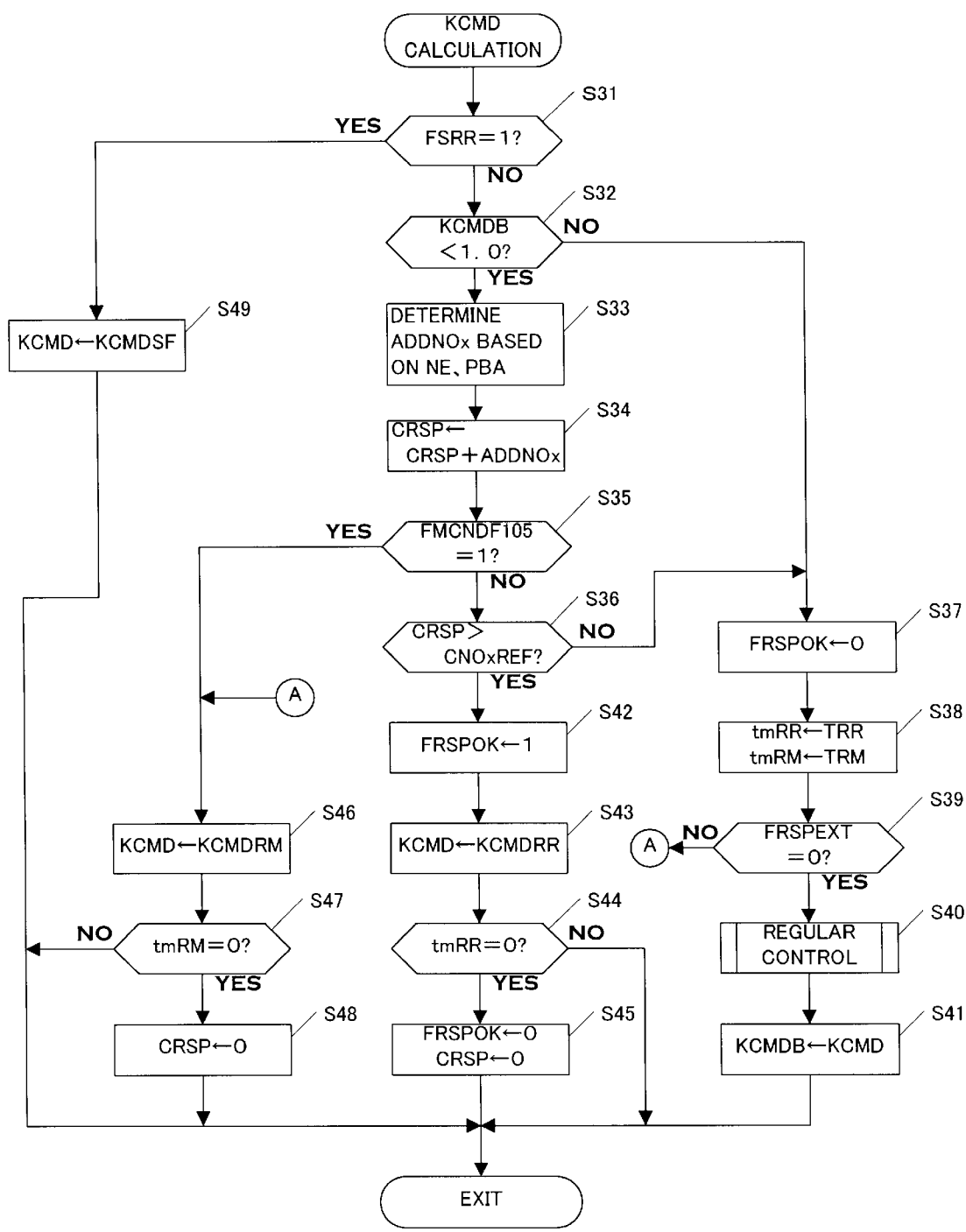
FIG. 2 is a flowchart showing a process for calculating a target air-fuel ratio coefficient KCMD.

FIG. 2 is a flowchart showing a process for calculating the target air-fuel ratio coefficient KCMD to be applied to the above-referenced equation (1). The ECU 5 performs this process at a constant time interval.

In step S31, when a SOx removal enrichment flag FSRR is set to 1, it indicates that an enrichment of the air fuel ratio is performed for removing the SO2 accumulated in the three-way catalyst 14. When FSRR is set to 1, the target air-fuel ratio coefficient KCMD is set to a predetermined value KCMDSF (for example, 1.03) for the SOx removal enrichment in step S49.

When FSRR is set to zero, it is determined in step S32 whether or not the lean operation is underway, in other words, whether or not a stored value KCMDB of the target air-fuel ratio coefficient KCMD to be stored in step S41 (to be described hereinafter) during the regular control is less than 1.0. When KCMDB is equal to or larger than 1.0, which indicates that the lean operation is not underway, the process proceeds to step S37, in which a reduction enrichment flag FRSPOK is set to zero (if it is set to 1, it indicates a reduction-enrichment is being performed). Then, in step S38, count-down timers tmRR and tmRM, which will be referred to in steps S44, S47 (to be described later), are started after their initial values are set to a reduction enrichment time TRR and TRM respectively (for example, 5 to 10 seconds).

Next, in step S39, it is determined whether or not an enrichment continuation flag FRSPEXT is set to zero. This flag is set to 1 by a deterioration determination process so as to indicate that the enrichment of the air-fuel ratio should be continued even after the deterioration determination of the NOx purifying device 15 would have been completed. When FRSPEXT=1, the process proceeds to step S46, in which the enrichment of the air-fuel ratio is continued.

When FRSPEXT=0, the operation is performed under the regular control and the target air-fuel ratio coefficient KCMD is set in accordance with the engine operating conditions in step S40. The target air-fuel ratio coefficient KCMD is basically calculated in accordance with the engine rotational speed NE and the absolute air-intake-pipe internal pressure PBA. KCMD may be changed to another value depending on different operating conditions, such as the conditions where the engine water temperature TW is low and the conditions where the engine is operated in a heavy load condition. Next, in step S41, the target air-fuel ratio coefficient KCMD calculated in step S40 is stored as a stored value KCMDB and the process exits here. In such engine operating condition where the lean operation is allowed, the target air-fuel ratio coefficient KCMD is set to a value less than 1.0.

When KCMDB<1.0 in step S32, which indicates that the lean operation is underway, an increment value ADDNOx is determined in accordance with the engine rotational speed NE and the absolute air-intake-pipe internal pressure PBA in step S33. The increment value ADDNOx, which is a parameter corresponding to the amount of NOx which is exhausted per unit time during the lean operation, is set such that it increases in accordance with the increase of the engine rotational speed NE and the increase of the absolute air-intake-pipe internal pressure PBA.

In step S34, a NOx amount counter CRSP is incremented by the increment value ADDNOx as shown in the following equation (2), so as to obtain a count value which is equivalent to the NOx exhaust amount, that is, the NOx amount trapped by the NOx trapping agent.

$$CRSP=CRSP+ADDNOx \qquad (2)$$

Next, in step S35, it is determined whether or not an execution condition flag FMCNDF105 is set to 1. The execution condition flag FMCNDF105 is set to 1 when the conditions for executing the deterioration determination of the NOx purifying device 15 are satisfied, as will be shown in FIG. 4 and FIG. 5. Usually, because FMCNDF105=0, the process proceeds to step S36, in which it is determined whether or not the value of the NOx amount counter CRSP has exceeded an allowance value CNOxREF. When the value of the NOx amount counter CRSP has not exceeded the allowance value CNOxREF, the process proceeds to step S37, in which the operation is controlled as usual unless the enrichment continuation flag FRSPEXT is set to 1. The allowance value CNOxREF is set to a value corresponding to, for example, a NOx amount that is slightly smaller than the maximum NOx trapping capability of the NOx trapping agent.

When CRSP>CNOxREF in step S36, the reduction enrichment flag FRSPOK is set to 1 in step S42, and then the target air-fuel ratio coefficient KCMD is set to a predetermined enrichment value KCMDRR corresponding to about 14.0 of the air-fuel ratio, so as to perform a reduction enrichment in step S43. Then, in step S44, it is determined whether or not the value of the timer tmRR is zero. While tmRR>0, this process exits. When tmRR=0 in step S44, the value of the reduction enrichment flag FRSPOK is set to zero and the value of the NOx amount counter CRSP is also reset to zero in step S45. Accordingly, from the next process cycle, the answer in step S36 becomes "NO", so that the operation is performed under the usual control.

On the other hand, when the conditions for the deterioration determination are satisfied (that is, when FMCNDF105=1 in step S35), the process proceeds from step S35 to step S46, in which the target air-fuel ratio coefficient KCMD is set to a predetermined deterioration determination enrichment value KCMDRM (<KCMDRR) corresponding to a slightly leaner value than a value equivalent to about 14.0 of the air-fuel ratio, so that the deterioration determination may be performed. The reason why the degree of enrichment is set smaller than when the regular reduction enrichment is performed is that the enrichment execution time may be shortened and wrong determination may easily occur at the deterioration determination time for the NOx purifying device 15 if the degree of enrichment is larger. Thus, the accuracy of the deterioration determination could be improved by means of setting the degree of enrichment smaller and prolonging the enrichment execution time. Besides, because of such smaller enrichment degree, the outputs of the O2 sensors 18 and 19 become sensitive to the SOx, so that the determination accuracy under the high SOx density condition could be improved.

In step S47, it is determined whether or not the value of the timer tmRM is zero. While tmRM>0, the process exits here. When tmRM=0, the value of the NOx amount counter CRSP is reset to zero in step S48.

According to the processing of FIG. 2, the reduction enrichment is usually carried out intermittently (S43 and S44) under such operating condition where the lean engine operation is possible, so that the NOx which has been trapped by the NOx trapping agent of the NOx purifying device 15 can be reduced properly. Also, when the conditions for the deterioration determination for the NOx purifying device 15 are satisfied, the degree of enrichment is set smaller than the reduction enrichment and the deterioration determination is performed over a longer time period than the reduction enrichment (S46, S47). Besides, SOx removal enrichment is carried out when the SOx removal is performed (S31 and S49). Additionally, when the enrichment continuation flag FRSPEXT is set to 1 in step S174 of FIG. 10 (to be described later), the target air-fuel ratio coefficient KCMD is maintained at the predetermined enrichment value KCMDRM even after the deterioration determination of the NOx purifying device 15 has been completed, so that the air-fuel ratio enrichment may be continued.

Figure 3:
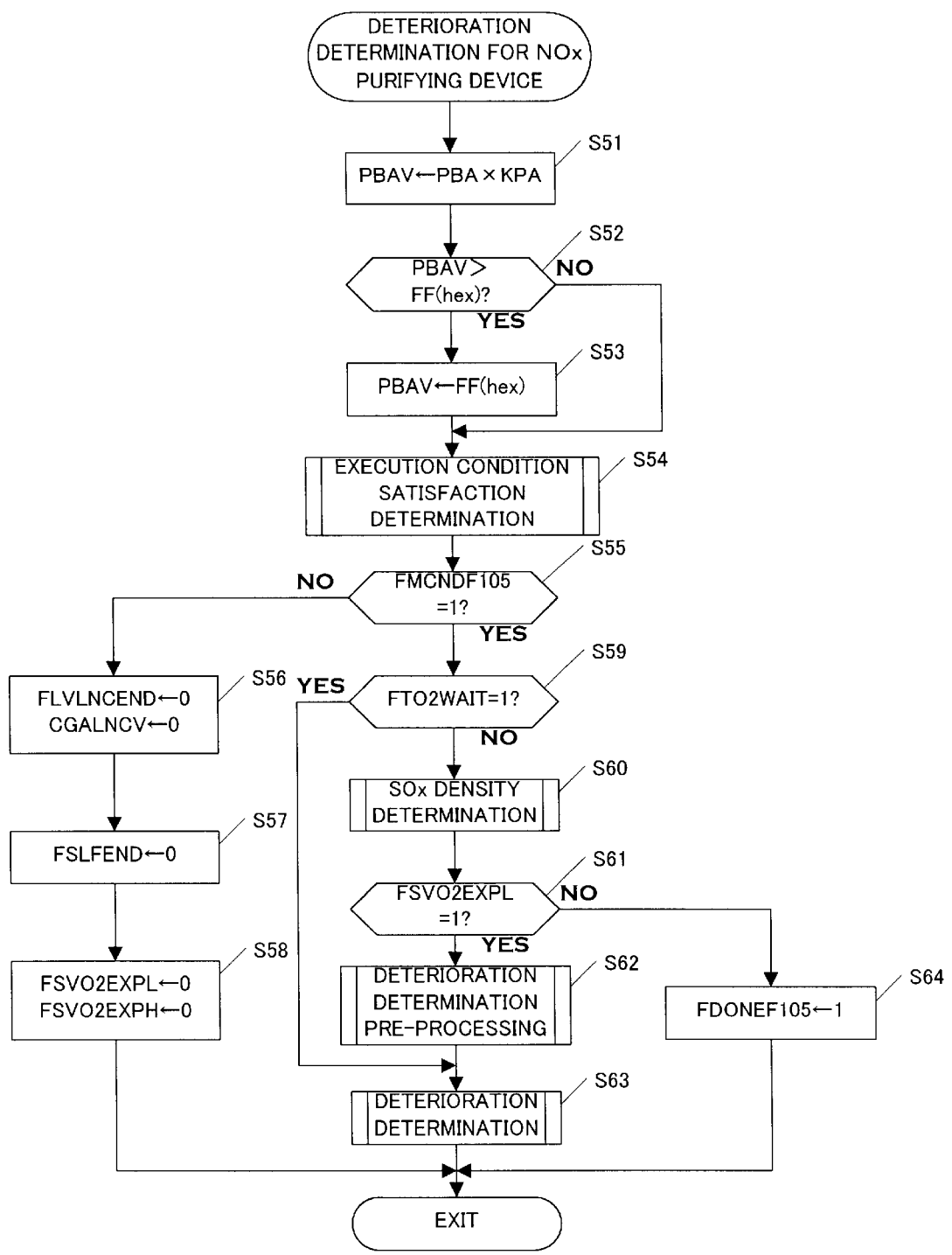
FIG. 3 is a flowchart showing a deterioration determination process upon a NOx purifying device.

FIG. 3 is a flowchart of a main routine for a deterioration determination process of the NOx purifying device 15. The ECU 5 in synchronization performs this process with the occurrence of the TDC signal pulses. In this process, the deterioration of the NOx purifying device 15 is determined by measuring the NOx trapping capability of the NOx trapping agent based on the output of the downstream O2 sensor 19.

In step S51, the absolute air-intake-pipe internal pressure PBA is corrected according to the following equation (3):

$$PBAV = PBA \times KPA \quad (3)$$

In the equation (3), KPA represents an atmospheric pressure correction coefficient to be decided depending on the output of the atmospheric pressure sensor PA, and PBAV represents an absolute air-intake-pipe internal pressure after correction with the atmospheric pressure (which will be hereinafter referred to as simply "corrected absolute pressure).

In step S52, it is determined whether or not the corrected absolute pressure PBAV exceeds a maximum value ("FF" in hexadecimal). When it is less than the maximum value, the process proceeds to step S54. When it exceeds the maximum value, the maximum value FF is set on the corrected absolute pressure PBAV in step S53, and the process proceeds to step S54. The corrected absolute pressure PBAV which has been obtained here may be used in some subsequent processes including an intake air amount accumulation process.

Figure 4:
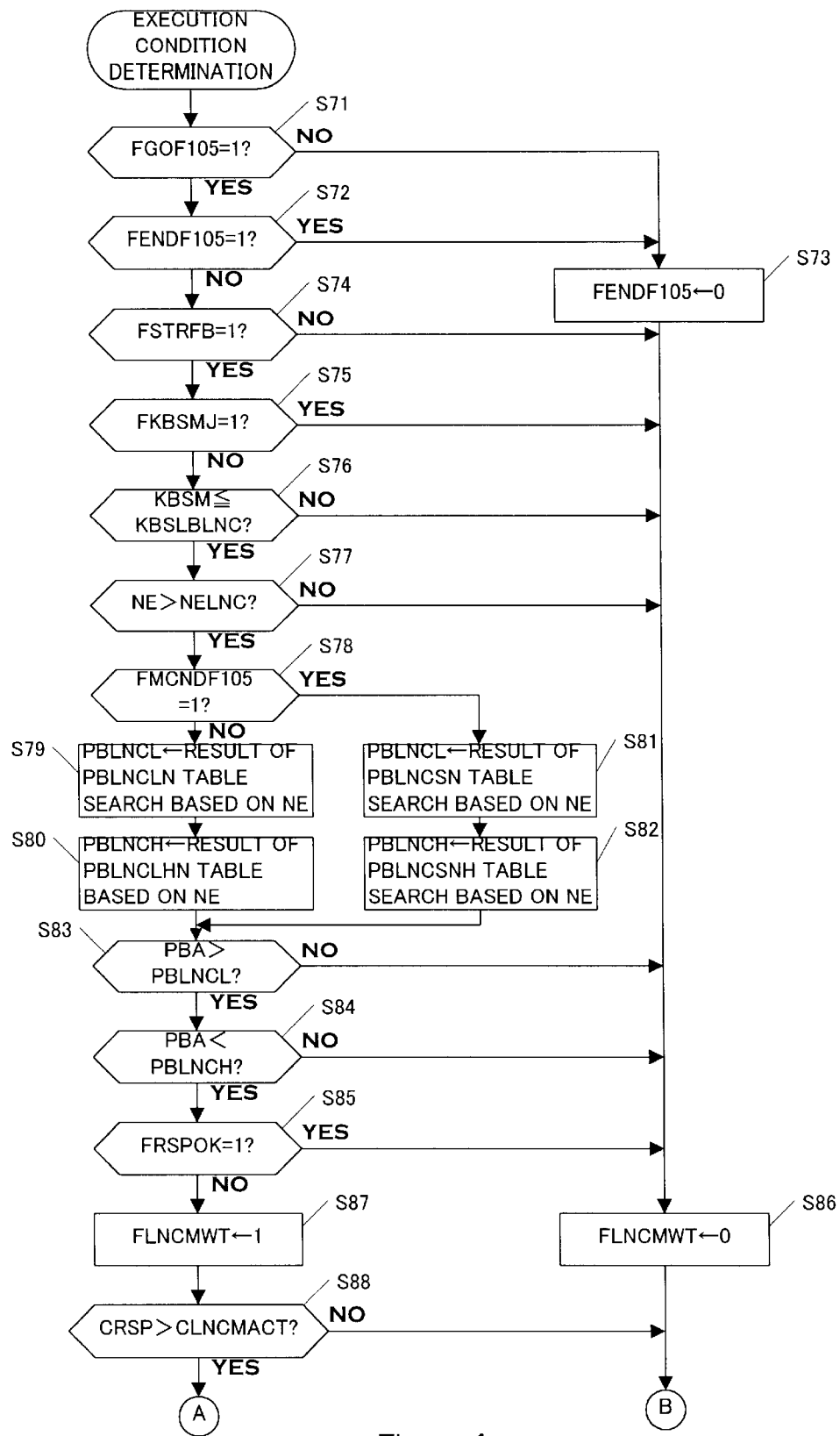
FIG. 4 is a flowchart showing an execution condition satisfaction determination in the deterioration determination process.
Figure 5:
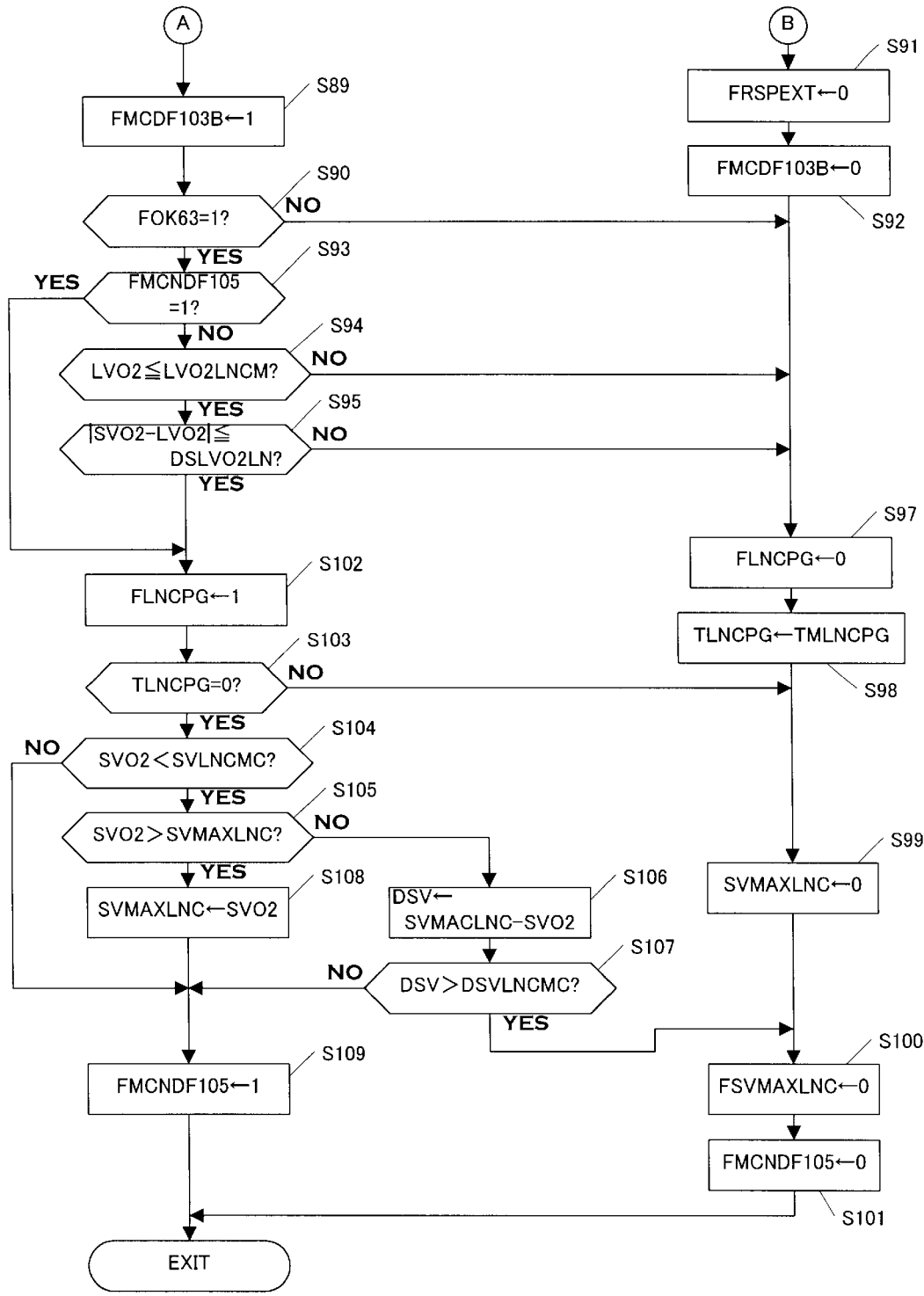
FIG. 5 is a flowchart, continued from FIG. 4, of the execution condition satisfaction determination in the deterioration determination process.

In step S54, an execution condition determination process to be described later with reference to FIG. 4 and FIG. 5 is performed. In this process, the execution condition flag FMCNDF105 is set to 1 when the conditions for executing the deterioration determination for the NOx purifying device 15 are satisfied.

In step S55, it is determined whether or not the execution condition flag FMCNDF105 is set to 1. When FMCNDF105=0 indicating the execution conditions are not satisfied, the process proceeds to step S56, in which a deterioration determination pre-processing completion flag FLVLNCEND and a counter CGALNCV, which are to be set in a deterioration determination pre-processing, are set to zero. Subsequently, in step S57 and step S58, a SO2 density determination completion flag FSLFEND, a first reference-exceeding flag FSVO2EXPL and a second reference-exceeding flag FSVO2EXPH are all set to zero, and this process exits here. The SOx density determination completion flag FSLFEND is set to 1 when the SOx density determination process is completed.

When the execution condition flag FMCNDF105=1 in step S55, which indicates that the execution conditions of the deterioration determination for the NOx purifying device 15 are satisfied, it is determined in step S59 whether or not a downstream sensor determination result waiting flag FTO2WAIT is set to 1. FTO2WAIT is set in a deterioration determination process. Initially, because FTO2WAIT=0, the process proceeds to step S60, in which an SOx density determination process is performed, and then, in step S61, it is determined whether or not the first reference exceeding flag FSVO2EXPL is set to 1. When FSVO2EXPL=1, a deterioration determination process is carried out in step S63 and the NOx purifying device deterioration determination process exits. When FTO2WAIT=1 in step S59, which indicates that a failure determination for the downstream O2 sensor 19 is being waited, the deterioration determination process is carried out immediately in step S63. When FSVO2EXPL=0 in step S61, the flag FDONEF105 is set to 1 in step S64, and this process exits.

FIG. 4 and FIG. 5 are a flowchart of the execution condition satisfaction determination process carried out in step S54 of FIG. 3. In this process, in order to stably determine the deterioration of the NOx purifying device 15 and secure the frequencies of the various monitors, the execution possibility of the deterioration determination for the NOx purifying device is decided considering various parameters.

In step S71, it is determined whether or not a deterioration determination instruction flag FGOF105 is set to 1. Because it is sufficient to perform the deterioration determination of the NOx purifying device 15 at a rate of about once one operation period (a period from the engine start to the stop), the deterioration determination instruction flag FGOF105 is set to 1 at the moment when the state of the engine operation has become stable after the engine is started. It should be noted that the deterioration determination is not permitted when any other monitoring is underway because such monitoring may influence the result of the deterioration determination. When the deterioration determination instruction flag FGOF105=1, it is determined in step S72 whether or not a deterioration determination completion flag FENDF105 is set to 1. This flag is set to 1 when the deterioration determination process is completed.

When determination in step S71 is NO indicating that the deterioration determination is not permitted, or when the answer in step S72 is YES indicating that the deterioration determination has been completed, the deterioration determination completion flag FENDF105 is reset to zero in step S73, and a deterioration determination pre-condition satisfaction flag FLNCMWT is set to zero in step S86. This flag is to be set to 1 to indicate the conditions for the deterioration determination are satisfied.

When determination in step S72 is NO, it is determined in step S74 whether or not a STR feedback execution flag FSTRFB is set to 1. FSTRFB=1 indicates that the STR feedback control by a STR (Self Tuning Regulator) is underway. The STR will be described later. This STR feedback control is to calculate the air-fuel ratio correction coefficient KLAF according to the equation (1). In another embodiment, such calculation may be performed with a PID feedback control with proportion terms and/or integral terms.

When determination in step S74 is YES, it is determined in step S75 whether or not a lean-burn prohibition flag FKBSMJ is set to 1. In order to prohibit the lean-burn operation, the lean-burn prohibition flag FKBSMJ is set to 1 by a lean-burn prohibition determination process. The lean-burn prohibition determination process is carried out under the fuel injection control as well as in parallel to the NOx purifying device determination process shown in FIG. 3. So, the lean-burn prohibition flag FKBSMJ may be referred to at any time.

When FKBSMJ=0 in step S75, it indicates that the lean-burn operation is permitted. Next, in step S76, it is determined whether or not the target air-fuel ratio KBSM is equal to or less than a predetermined value KBSLBLNC (for example, 20). When KBSM is equal to or smaller than KBSMLNC, it indicates the lean-burn operation is underway. Subsequently in step S77, it is determined whether or not the engine rotational speed NE exceeds a map value NELNC. This determination is performed so as not to perform the deterioration determination when the engine rotational speed is lower than a predetermined value.

When determinations in step S74, S76 and S77 are NO, or when the answer in step S75 is YES, it is determined that the conditions for the deterioration determination are not satisfied, so that the deterioration determination pre-condition satisfaction flag FLNCMWT is set to zero in step S86.

When the answer in step S77 is YES, it is determined in step S78 whether or not a deterioration determination execution condition flag FMCNDF105 is set to 1. Initially, because FMCNDF105=0, a lower threshold value PBLNCL is set to a value which is gained through searching a PBLNCLN table based on the engine rotational speed NE in step S79 and then an upper threshold value PBLNCH is set to a value which is gained through searching a PBLNCLHN table based on the engine rotational speed NE in step S80.

When FMCNDF105=1 in step S78, the lower threshold value PBLNCL is set to a value that is gained through searching a PBLNCSN which value is smaller than the PBLNCLN table based on the engine rotational speed NE in step S81 and then the upper threshold value PBLNCH is set to a value which is gained through searching a PBLNCSHN table which value is smaller than the PBLNCLHN table based on the engine rotational speed NE in step S82. Steps S79 through S82 are to set a region for determining the load of the engine 1 in accordance with the absolute air-intake-pipe internal pressure PBA.

In step S83, it is determined whether or not the absolute air-intake-pipe internal pressure PBA is larger than the lower threshold value PBLNCL. When PBA>PBLNCL, it is determined in step S84 whether or not the absolute air-intake-pipe internal pressure PBA is smaller than the upper threshold value PBLNCH. When the answer in step S83 or S84 is NO, in other words, when the absolute air-intake-pipe internal pressure PBA is smaller than the lower threshold value PBLNCL or larger than the upper threshold value PBLNCH, the pre-condition satisfaction flag FLNCMWT is set to zero in step S86.

When both answers in step S83 and S84 are YES, in other words, when PBLNCL<PBA<PBLNCH, it is determined in step S85 whether or not the reduction enrichment execution flag FRSPOK is set to 1. When FRSPOK=1, the deterioration determination is not performed because the reduction enrichment is being performed, and the process proceeds to step S86. When FRSPOK=0, a deterioration determination pre-condition satisfaction flag FLNCMWT is set to 1 in step S87.

Next, in step S88, it is determined whether or not the value of the NOx amount counter CRSP exceeds a deterioration determination permission value CLNCMACT. When CRSP does not exceed CLNCMACT, the process proceeds to step S91 in FIG. 5, in which the enrichment continuation flag FRSPEXT is set to 1, and then, in step S92, a downstream O2 sensor failure determination condition flag FMCDF103B is set to zero. When the downstream O2 sensor failure determination condition flag FMCDF103B is set to 1, it indicates that the conditions for executing a failure determination process (not shown) for the downstream sensor 19 are satisfied.

When CRSP>CLNCMACT in step S88, it is determined that the amount of the NOx trapped by the NOx trapping agent is large enough to perform the deterioration determination of the NOx purifying device 15. Accordingly, the downstream O2 sensor failure determination condition flag FMCDF103B is set to 1 in step S89, and then, in step S90, it is determined whether or not the upstream O2 sensor determination flag FOK63 is set to 1.

When determination in step S90 is YES, it is determined in step S93 whether or not an execution condition flag FMCNDF105 has already been set to 1. Initially, because FMCNDF105=0, the process proceeds to step S94, in which it is determined whether or not the downstream O2 sensor output LVO2 is equal to or less than a first downstream reference value LVO2LNCM (for example, 0.3V). This step is to confirm that the downstream O2 sensor output LVO2 before the execution of the deterioration determination enrichment indicates an exhaust lean condition. When FMCNDF105=1 in step S93, the above-described determination steps are not performed and the process proceeds directly to step S97.

When LVO2 is equal to or less than LVO2LNCM in step S94 indicating that the downstream O2 sensor output LVO2 indicates the exhaust lean condition, it is determined in step S95 whether or not an absolute difference value |SVO2-LVO2| between the upstream O2 sensor output SVO2 and the downstream O2 sensor output LVO2 is equal to or less than a predetermined value DSLVO2LN. This step is to confirm that both upstream O2 sensor output SVO2 and the downstream sensor output LVO2 are in a lean condition and further that their difference is very small. When the answer is YES, the process proceeds to step S102.

When the answer in step S95 is NO, a purge cut flag FLNCPG is set to zero in step S97 and a countdown timer TLNCPG is started after it is set to a predetermined time TMLNCPG (for example, two seconds) in step S98. Subsequently, a maximum value parameter SVMAXLNC is set to zero in step S99, a flag FSVMAXLNC is set to zero in step S100, an execution condition flag FMCNDF105 is set to zero in step S100, and then this process exits.

The purge cut flag FLNCPG when it is set to 1 indicates that purging of evaporated fuel in the fuel tank to the intake pipe 2 should be prohibited. The maximum value parameter SVMAXLNC is a parameter representing a maximum value of the upstream O2 sensor output SVO2 before the upstream O2 sensor output SVO2 reaches a second upstream reference value SVO2SLF (for example, 0.8V).

When the answer of step S95 is YES, the purge cut flag FLNCPG is set to 1 in step S102. This is to forcibly cut the purging of evaporated fuel because the density of the purging is uncertain and accordingly a wrong detection may easily happen. Next, in step S103, it is determined whether or not the value of the timer TLNCPG which has been started in step S98 is zero. While TLNCPG>0, the process proceeds to step S99. The timer TLNCPG is used for the purpose of waiting for a given time period for the influence of the purging to disappear after the purging is cut.

When the value of the timer TLNCPG becomes zero in step S103, the process proceeds to step S104, in which it is determined whether or not the upstream O2 sensor output SVO2 is less than a third upstream reference value SVLNCMC (for example, 0.7V). When SVO2 is not less than SVLNCMC, the process proceeds to step S109, in which the deterioration determination execution condition flag FMCNDF105 is set to 1.

When the upstream O2 sensor output SVO2 is less than the third upstream reference value SVLNCMC, it is determined in step S105 whether or not the upstream O2 sensor output SVO2 exceeds the maximum value parameter SVMAXLNC. Because the maximum value parameter SVMAXLNC is initialized to zero in step S99, the answer in step S105 is YES at first. So, the maximum value parameter SVMAXLNC is set to the current value of the O2 sensor output SVO2 in step S108, and then the execution condition flag FMCNDF105 is set to 1 in step S109.

When the upstream O2 sensor output SVO2 increases monotonously, the answer in step S105 always becomes YES. However, the output sometimes may decrease temporarily. In such a case, the answer of step S105 becomes NO and then, in step S106, a difference DSV between the maximum value parameter SVMAXLNC and the O2 sensor output SVO2 is calculated according to the following equation (4):

$$DSV = SVMAXLNC - SVO2 \quad (4)$$

Then, it is determined in step S107 whether or not the difference DSV is more than a predetermined value DSV-LNCMC. When the answer is NO indicating that the difference is not so significant, the execution condition flag FMCNDF105 is set to 1 in step S109.

When the difference DSV exceeds the predetermined value DSVLNCMC, it is considered that the air-fuel ratio has temporarily become in an exhaust lean condition due to the engine acceleration or other events. If the deterioration determination is continued in such case, there is a possibility of occurrence of wrong determination. Accordingly, the execution condition is regarded to be unsatisfactory and the deterioration determination is stopped. Thus, the flag FSV-MAXLNC is set to zero in step S100, the execution condition flag FMCNDF105 is set to zero in step S101, and then this process exits.

According to the deterioration determination execution condition determination process shown in FIG. 4 and FIG. 5, the conditions for the deterioration determination execution of the NOx purifying device 15 are basically satisfied when the pre-condition satisfaction flag FLNCMWT is set to 1. However, if the predetermined time has not elapsed since the evaporated fuel purge was prohibited, the execution condition is determined to be unsatisfied in step S103. Besides, under such conditions where the upstream O2 sensor output SVO2 is smaller than the third upstream reference value SVLNCMC, when the temporary decrease amount (DSV) becomes larger than the predetermined value DSVLNCMC (namely, when the answer in step S107 is YES), the execution condition is determined to be unsatisfied.

Figure 6:
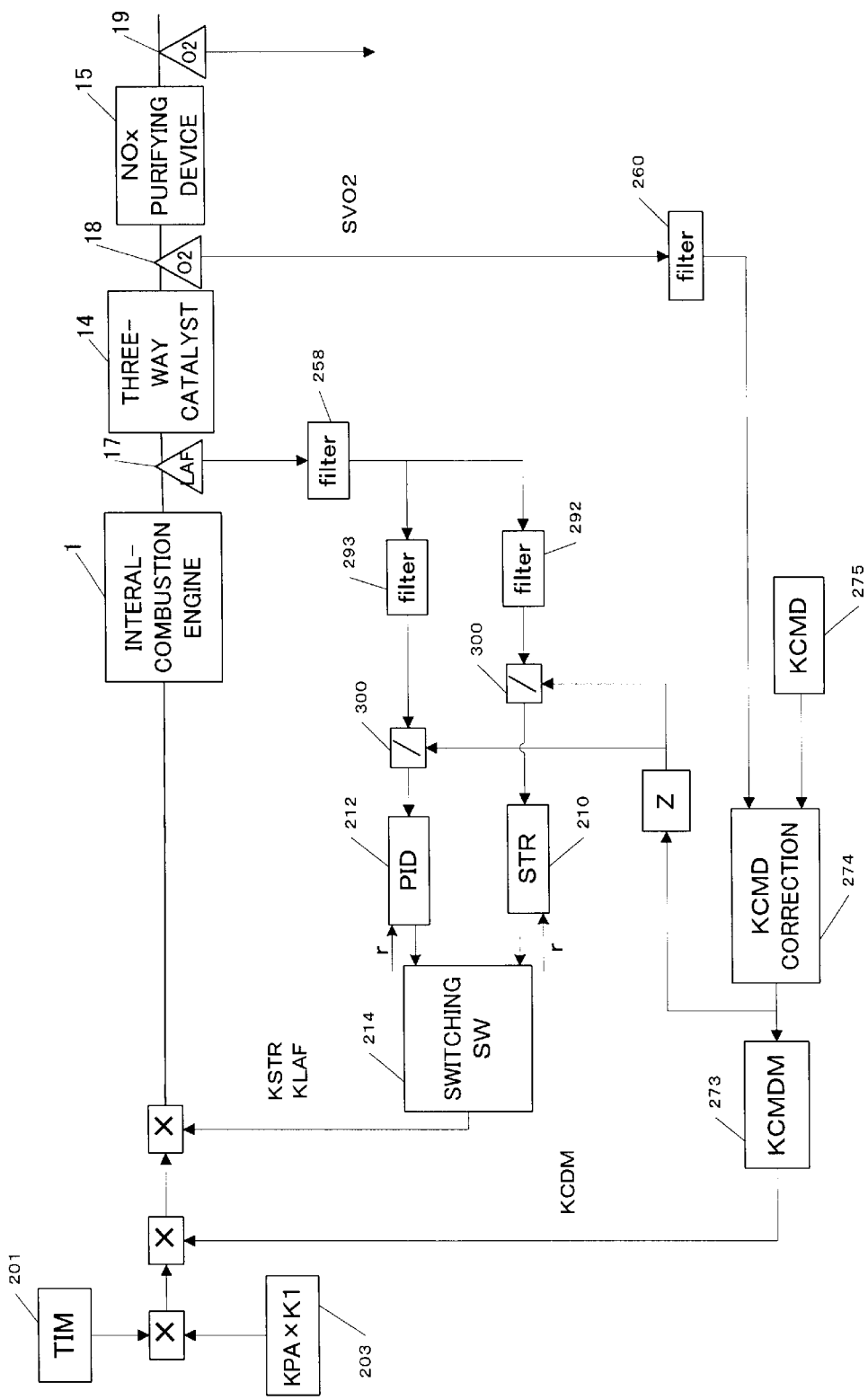
FIG. 6 is an overall block diagram of an air-fuel ratio feedback control device that employs a self-tuning regulator (STR).

FIG. 6 is a block diagram of an air-fuel ratio controller which incorporates an adaptive control device. This controller is provided with an adaptive control device 210 (which is a Self Tuning Regulator type of adaptive control device and is shown as STR in FIG. 6). The STR 210 receives outputs from a LAF sensor 17 via a filter 258 and a filter 292. A three-way catalyst 14 and a NOx purifying device 15 are disposed in an exhaust system of an internal-combustion engine representing a control plant 1.

The LAF sensor 17 is disposed upstream of the three-way catalyst, an O2 sensor 18 is disposed between the three-way catalyst and a lean NOx catalyst, and an O2 sensor 19 for detecting deterioration of the lean NOx catalyst is disposed downstream of the NOx purifying device 15. The output SVO2 of the O2 sensor 18 is input, via the filter 260, to a target air-fuel ratio correction block 274, in which a target air-fuel ratio KCMD is corrected correspondingly to a difference from the target value of the O2 sensor, so that a target air-fuel ratio correction coefficient KCMDM is obtained.

A base fuel quantity TIM (block 201) which is obtained through a search on a predetermined map is multiplied by various correction coefficients KTOTAL (block 203) including a canister purge correction coefficient, and such multiplication result is further multiplied by the target air-fuel ratio correction coefficient KCMDM. Such calculated fuel quantity is called a demand fuel injection quantity Tcyl.

Feedback correction coefficients KSTR and KLAF are obtained respectively in the self-tuning regulator (STR) 210 and the PID controller 212 based on the air-fuel ratio KACT(k) detected by the LAF sensor 17 and the target air-fuel ratio KCMD (k-d'). The demand fuel injection quantity Tcyl is multiplied by either feedback correction coefficient KSTR or KLAF which is selected by a switch 114 in accordance with the operating conditions, so that an output fuel quantity TOUT is obtained. The output fuel quantity TOUT is supplied to the internal-combustion engine 1.

Thus, the air-fuel ratio is controlled based on the output of the LAF sensor 17 to meet the target air-fuel ratio. In order to exert the purification capability of the three-way catalyst, the upstream air-fuel ratio must match the desired air-fuel ratio as soon as possible after the output of the O2 sensor 18 located downstream of the three-way catalyst reverses. For that purpose, as long as the operating conditions allow, the feedback control is carried out by means of the self-tuning (adaptive) regulator 210 that is capable of compensating for the target air-fuel ratio KCMD dynamically. In such a way, the detected air-fuel ratio KACT can quickly be converged to the target air-fuel ratio KCMD.

In order to monitor the deterioration of the NOx purifying device 15, the air-fuel ratio is set to a stoichiometric ratio or slightly richer than the stoichiometric ratio when the lean-burn operation continues to run. Thus, the deterioration of the NOx purifying device is determined based on the relation between the output of the O2 sensor 18 disposed upstream of the NOx purifying device and the output of the O2 sensor 19 disposed downstream of the NOx purifying device upon the change of the air-fuel ratio from lean to rich. When the lean-burn operation is changed to the stoichiometric or slightly richer condition, there may occur an overshoot of the actual air-fuel ratio due to the feedback control of the air-fuel ratio, which may cause a further richer air-fuel ratio than the target air-fuel ratio. This may eventually result in a poor accuracy of the deterioration determination.

As to the filters shown in FIG. 6, cut-off frequency characteristics for the filters are set according to control schemes. For example, the filter 258 is set as a low-pass filter that has a cut-off frequency characteristic of 500 Hz and the filter 292 is set as a low-pass filter that has a cut-off frequency characteristic of 4 Hz. The filter 293 is set to be equal to or larger than the filter 292 in terms of the cut-off frequency characteristic. Besides, a low-pass filter that has a cut-off frequency characteristic of about 1600 Hz for example is used in the filter 260 connected to the O2 sensor 18. A low-pass filter 500 that has a frequency characteristic of about 1000 Hz is used as a filter located in the subsequent stage of the second O2 sensor 19.

The self-tuning regulator 210 uses an adaptive parameter $\hat{\theta}$ (k) (coefficient vector) that is calculated by a parameter adjusting mechanism, so as to calculate a feedback correction coefficient KSTR(k). The adaptive parameter $\hat{\theta}$ consists of a scalar quantity b0(k) which determines a gain, control elements r2(k), r3(k), r4(k) which are expressed in terms of an operation quantity and a control element S0(k) which is expressed in terms of a control quantity.

The adaptive parameter $\hat{\theta}$ is specifically represented by the following equation (5). In the equation (5), $\Gamma(k)$ represents a gain matrix which decides an identification/estimation speed of the adaptive parameter, $\zeta^T(k)$ represents an input to the parameter adjusting mechanism and an e* (k) represents a signal for indicating an error.

$$\hat{\theta}(k)=\hat{\theta}(k-1)+\Gamma(k-1)\zeta(k-d)e^*(k) \tag{5}$$

As shown in FIG. 6 according to Japanese Patent Application Unexamined Publication (Kokai) No. H10-9019, an input y(k) to the self tuning regulator 210 is obtained as a ratio of the detected air-fuel ratio KACT(k) to the target air-fuel ratio KCMD(k-d'), that is, KACT(k)/KCMD(k-d'). A target value r of the self-tuning regulator 210 is defined as a predetermined value, namely a fixed value of 1.0 specifically. In other words, the self tuning regulator operates in such manner that the target value r and the control input become equal to each other, that is, 1.0=KACT/KCMD or KCMD=KACT.

Figure 7:
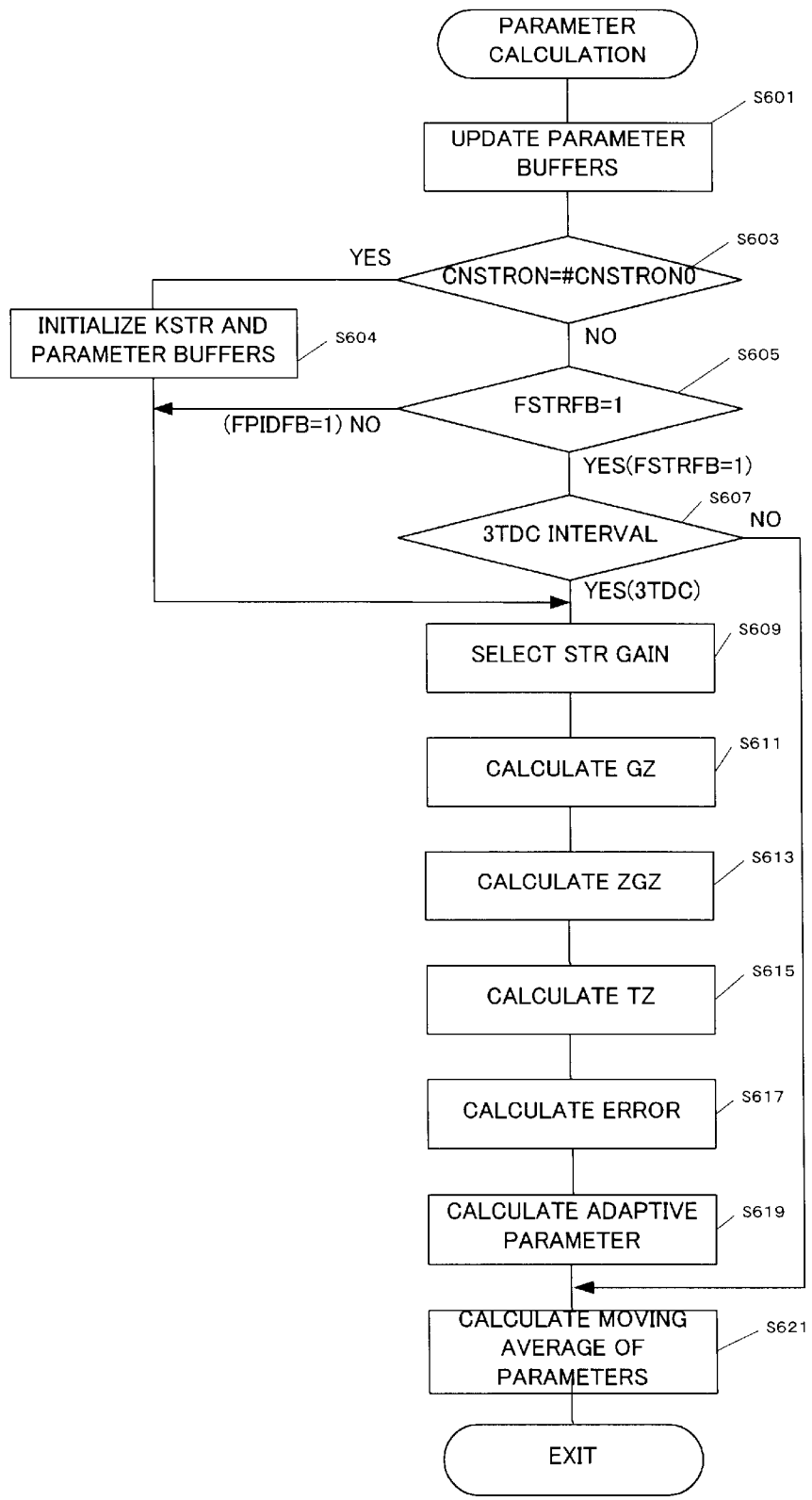
FIG. 7 is a flowchart of a process for calculating adaptive parameters of the self-tuning regulator.

FIG. 7 shows a flow of a parameter calculation. The above-described parameter, consisted of the scalar quantity b0(k) for determining a gain, control elements r2(k), r3(k), r4(k) and a control element S0(k) that is expressed in terms of the control quantity, is stored in several buffers.

As for the calculation process, at first, in step S601, values in the parameter buffers for the preceding cycles are updated, namely, B0(n-1) through B0(n-8), R2(n-1) through R2(n-8), R3(n-1) through R3(n-8), R4(n-1) through R4(n-8) and S0(n-1) through S0(n-8) are updated. Next in step S603, it is determined whether or not a delay counter CNSTRON of the air-fuel ratio feedback by the STR has become equal to a predetermined value #CNSTRON0. When the answer is NO, the process proceeds to step S605, in which it is determined whether or not a STR feedback flag FSTRFB is set to 1. When it is 1, it is determined in step S607 whether or not the elapsed time has reached the 3TDC interval that is set as a calculation timing for the parameter. When the answer in step S607 is YES, the process proceeds to step S609. Otherwise the process jumps to step S621, in which a moving average for the parameter is calculated.

When the delay counter becomes equal to the predetermined value in step S603, the process proceeds to step S604 for initializing KSTR and the parameter buffers; that is, KSTR(n-1) through KSTR(n-18) are initialized to KCMDFB, B0(n) through B0(n-8) are initialized to 1.0, and R2(n) through R2(n-8), R3(n) through R3(n-8) and R4(n) through R4(n-8) are respectively initialized to zero. S0(n) through S0(n-8) are initialized to zero, too.

Figure 8:
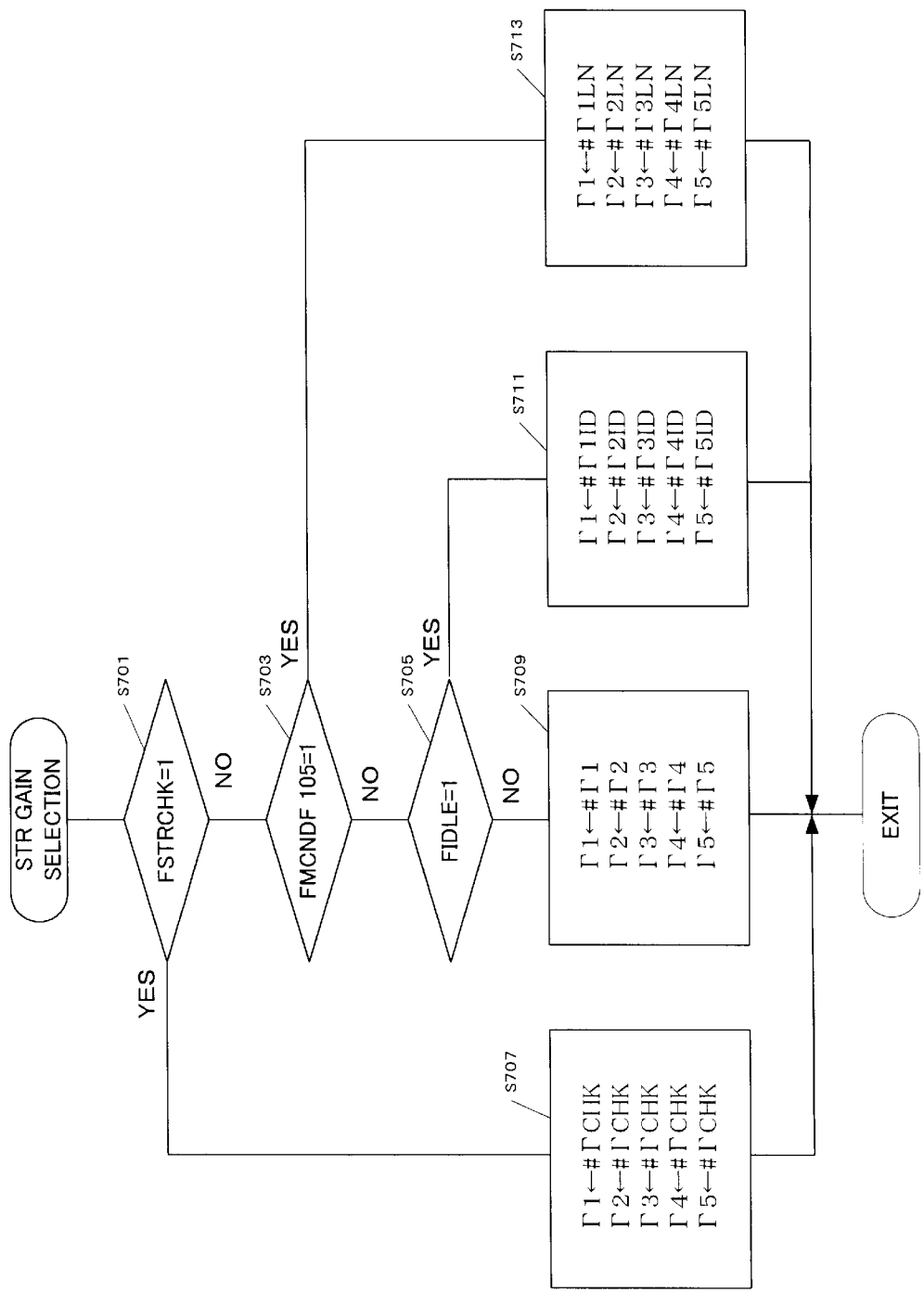
FIG. 8 is a flowchart of a process for selecting the gains of the self-tuning regulator.

FIG. 8 shows the details of the STR gain selection step S609 in FIG. 7. In step S701, it is determined whether or not a STR divergence condition determination flag FSTRCHK is set to 1. When it is 1, the process proceeds to step S707, in which gains $\Gamma 1$ through $\Gamma 5$ are set to a predetermined value #$\Gamma$CHK. When the flag FSTRCHK is not set to 1, the process proceeds to step S703, in which it is determined whether or not a deterioration determination execution condition flag FMCNDF105 is set to 1. When the flag FMCNDF105 is set to 1, the process proceeds to step S713, in which gains $\Gamma 1$ (gamma 1) through $\Gamma 5$ (gamma 5) are respectively set to predetermined values #$\Gamma$1LN through #$\Gamma$5LN which are relatively small values. #$\Gamma$1LN through #$\Gamma$5LN are set to such small values that the air-fuel ratio may not overshoot when the air-fuel ratio is changed from lean to rich in order to monitor the deterioration of the NOx purifying device.

When the flag is not set to 1 in step S703, the process proceeds to step S705, in which it is determined whether or not a flag FIDLE indicating an idle state is set to 1. When the flag FIDLE is set to 1, the process proceeds to step S711, in which gains $\Gamma 1$ through $\Gamma 5$ are respectively set to gains #$\Gamma$1ID through #$\Gamma$51D indicating the idling time. When the flag FIDLE is not set to 1, the process proceeds to step S709, in which gains $\Gamma 1$ through $\Gamma 5$ are respectively set to predetermined values #$\Gamma$1 through #$\Gamma$5.

After the STR gains have been such settled, referring back to FIG. 7, a GZ vector is calculated. The GZ vector is expressed as shown in the following equation (6):

$$\begin{bmatrix} GZ1 \\ GZ2 \\ GZ3 \\ GZ4 \\ GZ5 \end{bmatrix} = \begin{bmatrix} \Gamma 1 * KSTR(n-3*\#TSTR) \\ \Gamma 2 * KSTR(n-3-3*\#TSTR) \\ \Gamma 3 * KSTR(n-6-3*\#TSTR) \\ \Gamma 4 * KSTR(n-9-3*\#TSTR) \\ \Gamma 5 * KSTR(n-3*\#TSTR) \end{bmatrix} \quad \text{Equation (6)}$$

Then, in step S613, ZGZ (a scalar) is calculated. ZGZ is expressed by the following equation (7):

$$ZGZ=B0(n-3)*KSTR(n-3*\#TSTR)*GZ1+KSTR(n-3-3*\#TSTR)*GZ2+KSTR(n-6-3*\#TSTR)*GZ3+KSTR(n-9-3*\#TSTR)*GZ4+KACT(n-3*\#TSTR)*GZ5 \tag{7}$$

Next, in step S615, TZ (a scalar) is calculated. ZGZ is expressed by the following equation (8):

$$TZ=B0(n-3)*TSTR(n-3*\#TSTR)+R2(n-3)*KSTR(n-3-3*\#TSTR)+R3(n-3)*TSTR(n-6-3*\#TSTR)+R4(n-3)*KSTR(n-9-3*\#TSTR)+S0(n-3)*KACT(n-3*\#TSTR) \tag{8}$$

Then, in step S617, an error is calculated. The error is expressed by the following equation (9):

$$ERROR = (KACT - TZ)/(ZGZ + 1.0) \quad (9)$$

After these calculations have been carried out, an adaptive parameter is calculated in step S619. The adaptive parameter is expressed by the following equation (10):

$$\begin{bmatrix} B0(n) \\ R2(n) \\ R3(n) \\ R4(n) \\ S0(n) \end{bmatrix} = \begin{bmatrix} B0(n-3) + GZ1 * ERROR \\ \#SGM * R2(n-3) + GZ2 * ERROR \\ \#SGM * R3(n-3) + GZ3 * ERROR \\ \#SGM * R4(n-3) + GZ4 * ERROR \\ \#SGM * S0(n-3) + GZ5 * ERROR \end{bmatrix} \quad \text{Equation (10)}$$

Then, in step S621, a TDC moving average for the adaptive parameters is calculated. This moving average is calculated for a predetermined number of times so that the update cycle for the adaptive parameters can be shortened and the frequency that may cause the decrease of the gain of the sensor can be avoided. Thus, the parameter calculation is completed.

In this way, when the execution conditions for monitoring the deterioration of the NOx purifying device are satisfied, the target value of the air-fuel ratio is set to the stoichiometry value or a slightly richer value and the gain of the air-fuel ratio feedback is altered. As a result, the detected air-fuel ratio KACT(k) may follow the target air-fuel ratio KCMD (k-d') without any overshoot occurrence.

In the structure shown in FIG. 6, in addition to the self-tuning regulator 210, the PID controller 212 is provided which may be used for determining the feedback correction coefficient KLAF in accordance with the PID control rule. Either controller may be selected through the switching mechanism. As for the self-tuning regulator 210, its responsiveness is relatively high. If it is used, for example, when returning from the fuel cut, the stability of the control may be disturbed due to oscillation of the control variables. Therefore, use of the control rule is switched between the adaptive control and the PID control depending on the operating conditions.

Although the present invention has been above described with reference to the specific embodiments, the present invention is not intended to be limited to those embodiments but various variations and alternatives are to be included in the scope of the present invention.

What is claimed is:

1. An air-fuel ratio feedback controlling apparatus for an internal-combustion engine, comprising:
   an air-fuel ratio detector disposed in an exhaust system of the internal-combustion engine for detecting air-fuel ratio of exhaust gas;
   a NOx purifier for purifying NOx contained in the exhaust gas during lean operation;
   a downstream O2 sensor disposed downstream of the NOx purifier;
   an upstream O2 sensor disposed upstream of the NOx purifier;
   a feedback controller for performing feedback control of an air-fuel ratio of air fuel mixture to be supplied to the internal-combustion engine based on outputs of the air-fuel ratio detector;
   a diagnostic system for diagnosing the NOx purifier by changing the air-fuel ratio of the air-fuel mixture to be supplied to the internal combustion engine from lean to rich and detecting on the outputs of the downstream O2 sensor and the upstream O2 sensor; and
   a gain changer for reducing feedback control gain of the feedback controller when the diagnostic system changes the air-fuel ratio from lean to rich; and
   a three way catalyst disposed upstream of the NOx purifier,
   wherein the diagnostic system carries out the checking of the NOx purifier when the three way catalyst is determined to be normal.

2. The air-fuel ratio feedback controlling apparatus according to claim 1 wherein the NOx purifier includes a NOx trapping agent.

3. The air-fuel ratio feedback controlling apparatus according to claim 1, wherein the diagnostic system checks the NOx purifier for deterioration based on the output of the downstream O2 sensor and the upstream O2 sensor after air-fuel ratio is altered to rich.

4. The air-fuel ratio feedback controlling apparatus according to claim 1, further comprising a three way catalyst disposed upstream of the NOx purifier, wherein the diagnostic system carries out the checking of the NOx purifier after the three way catalyst is recovered from sulfur poisoning.

5. The air-fuel ratio feedback controlling apparatus according to claim 1, wherein the feedback controller includes an adaptive controller calculating feedback correction coefficient using adaptive parameter.

6. The air-fuel ratio feedback controlling apparatus according to claim 5, wherein the adaptive parameter is defined by the equation:

$$\hat{\theta}(k) = \hat{\theta}(k-1) + \Gamma(k-1)\zeta(k-d)e^*(k)$$

where $\Gamma(k)$ is a gain matrix which decides identification/estimation speed of the adaptive parameter, $\zeta^T(k)$ represents an input and an $e^*(k)$ represents error and when the diagnostic system changes the air-fuel ratio from lean to rich, the gain changer selects $\Gamma(k)$ from a plurality of gain matrixes each defining a set of gain constants, the selected $\Gamma(k)$ being of values that do not cause overshooting of the air/fuel ratio during diagnosis by the diagnostic system.

7. Method for controlling an internal combustion engine having an air-fuel ratio detector disposed in an exhaust system of the internal combustion engine for detecting air-fuel ratio of exhaust gas, a NOx cleaner for cleaning NOx from the exhaust gas during lean operation, a downstream O2 sensor disposed downstream of the NOx cleaner, an upstream O2 sensor disposed upstream of the NOx cleaner, a three-way catalyst disposed upstream of the NOx cleaner, the method comprising:
   performing feedback control of an air-fuel ratio of air-fuel mixture to be supplied to the internal-combustion engine based on outputs of the air-fuel ratio detector;
   checking the NOx cleaner for deterioration by changing the air-fuel ratio of the air-fuel mixture from lean to rich and detecting the outputs of the downstream O2 sensor and the upstream O2 sensor; and
   changing a feedback control gain to a smaller value when the air-fuel ratio is changed from lean to rich for checking the NOx cleaner,
   wherein the checking of the NOx cleaner is carried out when the three way catalyst is determined to be normal.

8. The method according to claim 7, further comprising a step of calculating feedback correction coefficient using adaptive parameter.

9. The method according to claim 8, wherein the adaptive parameter is defined by the equation:

$$\hat{\theta}(k) = \hat{\theta}(k-1) + \Gamma(k-1)\zeta(k-d)e^*(k)$$

where $\Gamma(k)$ is a gain matrix which decides identification/estimation speed of the adaptive parameter, $\zeta^T(k)$ represents an input and an $e^*(k)$ represents errors, the method further comprising selecting, when the air-fuel ratio is changed from lean to rich for checking the NOx cleaner, $\Gamma(k)$ from a plurality of gain matrixes each defining a set of gain constants, the selected $\Gamma(k)$ being relatively small such that no overshooting of the air/fuel ratio takes place during checking of the NOx.

10. The method according to claim 7, wherein the NOx cleaner includes a NOx trapping agent for trapping NOx and catalyst for promoting oxidization and reduction.

11. The method according to claim 10, wherein checking of the NOx cleaner includes checking the NOx cleaner for deterioration based on the output of the downstream O2 sensor and the upstream O2 sensor when richer air-fuel mixture is supplied to the engine.

12. The method according to claim 11, wherein checking of the NOx cleaner is carried out after the three way catalyst disposed upstream of the NOx cleaner is recovered from sulfur poisoning.

13. An electronic control unit for an automobile including a processor, a random access memory, and a read-only-memory, said automobile having an air-fuel ratio detector disposed in an exhaust system of an internal combustion engine for detecting air-fuel ratio of exhaust gas, a NOx cleaner for cleaning NOx from the exhaust gas during lean operation, and a downstream O2 sensor disposed downstream of the NOx cleaner, an upstream O2 sensor disposed upstream of the NOx purifier, a three way catalyst disposed upstream of the NOx clean said electronic control unit being programmed to:

perform feedback control of an air-fuel ratio of air-fuel mixture to be supplied to the internal-combustion engine based on outputs of the air-fuel ratio detector;

check the NOx cleaner for deterioration by changing the air-fuel ratio of the air-fuel mixture from lean to rich and detecting the outputs of the downstream O2 sensor and the upstream O2 sensor; and to change a feedback control gain to a smaller value when the air-fuel ratio is changed from lean to rich for checking the NOx cleaner, wherein the checking of the NOx cleaner is carried out when the three way catalyst is determined to be normal.

14. The electric control unit according to claim 13, further including an adaptive controller calculating feedback correction coefficient using adaptive parameter.

15. The electric control unit according to claim 14, wherein the adaptive parameter is defined by the equation:

$$\hat{\theta}(k)=\hat{\theta}(k-1)+\Gamma(k-1)\zeta(k-d)e^*(k)$$

where $\Gamma(k)$ is a gain matrix which decides identification/estimation speed of the adaptive parameter, $\zeta^T(k)$ represents an input and an $e^*(k)$ represents errors, the electric control unit being further programmed to select, when the air-fuel ratio is changed from lean to rich for checking the NOx cleaner, $\Gamma(k)$ from a plurality of gain matrixes each defining a set of gain constants, the selected $\Gamma(k)$ being of values that do not cause overshooting of the air/fuel ratio during checking of the NOx cleaner.

* * * * *